United States Patent [19]
So

[11] Patent Number: 5,883,664
[45] Date of Patent: Mar. 16, 1999

[54] APPARATUS AND METHOD FOR TESTING CATV TRANSMISSION LINE

[75] Inventor: Heung-Seob So, Seoul, Rep. of Korea

[73] Assignee: Korea Electric Power Data Network Co., Ltd., Seoul, Rep. of Korea

[21] Appl. No.: 936,743

[22] Filed: Sep. 25, 1997

[30] Foreign Application Priority Data

Mar. 4, 1997 [KR] Rep. of Korea .................... 1997 7048

[51] Int. Cl.$^6$ ................................................. H04N 17/00
[52] U.S. Cl. .............................................. 348/192; 348/12
[58] Field of Search ............................ 348/6, 7, 10, 12, 348/13, 180, 181, 182, 192, 193; 455/3.1, 5.1

[56] References Cited

U.S. PATENT DOCUMENTS

| | | |
|---|---|---|
| 4,311,974 | 1/1982 | Reddy . |
| 4,365,239 | 12/1982 | Mongeon . |
| 5,553,064 | 9/1996 | Paff et al. . |
| 5,642,154 | 6/1997 | Krishnamurthy et al. ................. 348/12 |
| 5,738,525 | 4/1998 | Davies ................................ 348/192 X |

*Primary Examiner*—Nathan Flynn
*Attorney, Agent, or Firm*—Finnegan, Henderson, Farabow, Garrett & Dunner

[57] ABSTRACT

An apparatus for testing a CATV transmission line according to the present invention, wherein a down-signal to subscribers from a CATV broadcasting station is split into a plurality of signals and an upstream transmission line for leading said down-signal and a plurality of downstream transmission lines for transmitting split signals are separated from each other, whereby said upstream transmission line and said downstream transmission lines are tested separatedly, comprises one main input terminal adapted to be connected to said upstream transmission line, a plurality of main output terminals adapted to be connected to a plurality of downstream transmission lines respectively, a splitter for splitting a signal from said main input terminal to a plurality of first split output terminals, said splitter being connected to said main input terminal and provided with said plurality of first split output terminals, and a plurality of second split output terminals, connected to said plurality of main output terminals respectively and arranged so as to be connectable to said plurality of first split output terminals respectively.

7 Claims, 2 Drawing Sheets

FIG. 2a
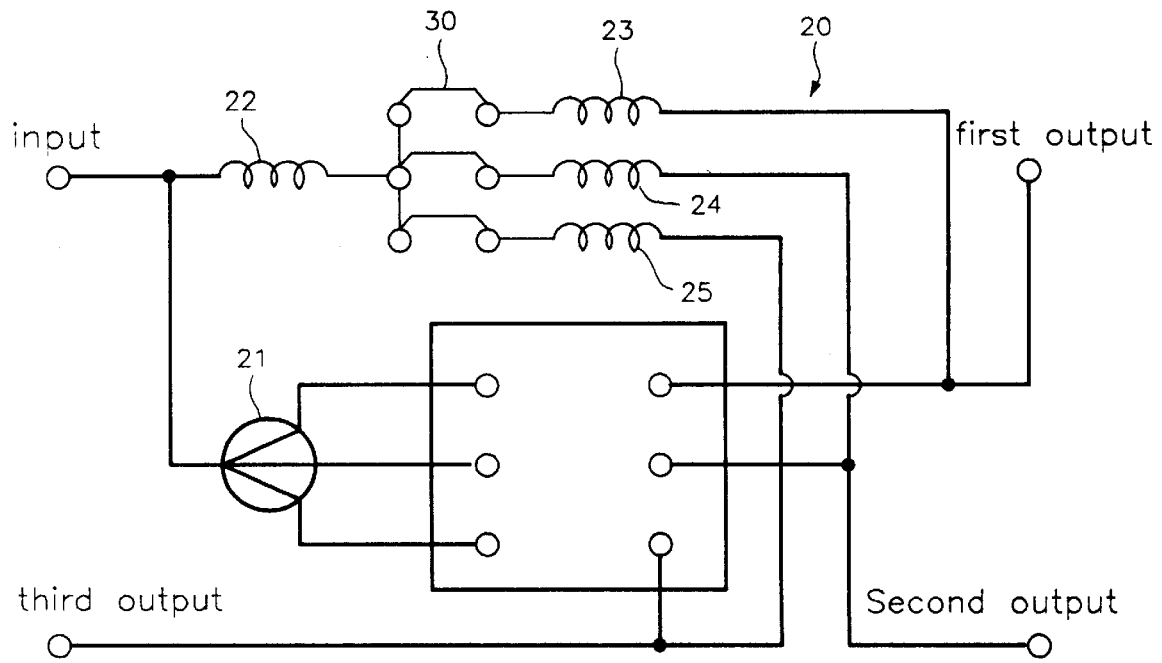
FIG. 2b
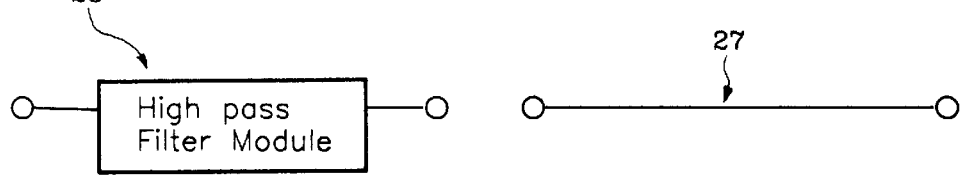
FIG. 2c
FIG. 2d
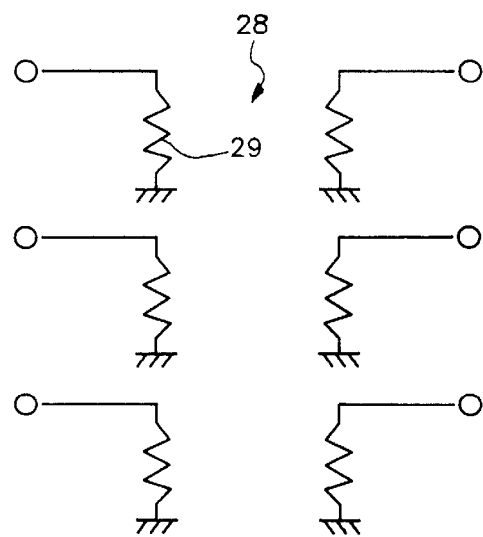

APPARATUS AND METHOD FOR TESTING CATV TRANSMISSION LINE

FIELD OF THE INVENTION

The present invention relates to an apparatus and a method for testing a CATV transmission line and more specifically an apparatus and a method wherein up-noises to a broadcasting station from subscribers, which are detrimental in providing a bidirectional CATV servicing, are tested separately or on individual line base in order to effectively detect noise source.

Generally, a CATV service is based on a bidirectional communication dealing with two-way transmission and receiving, in which a down-signal is transmitted from a CATV broadcasting station to subscribers and at the same time up-signals are transmitted from subscribers to the broadcasting station. In this case, there is mainly employed a modulation method to demarcate the two different signals, in which a down-signal is modulated, for example, to a RF signal in a band of 54–450 MHz and an up-signal to a RF signal in a band of 5–30 MHz, for example.

However, only down-service is currently rendered in fact, due to the problem of perfect noise prevention, because the frequency band of 5–30 MHz within which up-signals from subscribers are transmitted is most vulnerable to external electric waves. Prior arts of transmission system for bidirectional CATV service may be found, for example, in U.S. Pat. Nos. 4,311,974; 4,365,239; and 5,553,064. Those relate to improvements in respects of servicing or technique in a cable transmission system for a CATV or the like, although a device or method for detecting noise in up-signals for enhanced service quality or improved convenience is not mentioned.

First, a current CATV transmission system will be briefly explained with regard to FIG. 1 of the drawings, which shows an arrangement of schematic transmission system for a bidirectional CATV service.

Generally a current CATV system 10 comprises a plurality of amplifiers 12,13,14 for compensating attenuation suffered by down- and up-signals, transmitted between a broadcasting station 11 and subscribers 19; a plurality of splitters 15,16,17 for transmitting a broadcasting signal from a broadcasting station to subscribers in a form of tree by splitting it; and a plurality of branching devices 18, positioned in areas of densely-populated subscribers and for conducting signal branching to individual subscribers 19 from a same splitting line. Amplifiers need to be installed on a transmission line at each interval of maximum 600 meters so that a broadcasting signal is not attenuated to the extent that the broadcasting servicing is affected, but they are preferably installed at each interval of 200 meters for broadcasting service of good quality. Although splitters 15,16,17 act basically to conduct signal distributing, they are provided with attenuating function enabling all subscribers to transmit or receive signals of uniform quality by adjusting attenuation in such a manner that the attenuation increases with the length of transmission line, as there could be differences in the length of the transmission lines, connected to the outputs of the relevant splitter. A splitter with such an attenuating function is called a directional splitter. It would be evident to a man skilled in the art that a plurality of amplifiers and splitters may be used depending on the distance and the number of splitting points in a practical transmission system, while only respective three amplifiers and splitters are shown in FIG. 1.

A conventional method of divisional tests on a transmission system of CATV as depicted in FIG. 1 will be described below. As a first step, the output line 15' of the splitter 15 situated nearest to a broadcasting station 11 is end-blocked to intercept up-transmission and then noise on the transmission line between the amplifier 12 and an amplifier 14 is tested or measured at the position of amplifier 12, located on the input side of splitter 15. As a result of test, when no noise was detected there, the transmission line between the amplifier 12 and an amplifier 13 is decided to be defective and the corresponding transmission line is removed to eliminate noise source. On the other hand, when noise is detected, a connector in the output transmission line 15" of splitter 15 is detached, a terminal device is connected, and test is conducted to see if noise is led-in from the input line 12' of the splitter 15. When noise is detected as the result of that test, the noise is regarded as being led in the input line 12' between the amplifier 12 and the splitter 15 and so the noise source in that line is removed. On the other hand, when no noise is detected, the terminal device in the output line 15" of the splitter 15 is removed, the connector is connected back and test is conducted to see if noise was led-in from the output line 15" of the splitter 15. When noise is detected as the result of test on the output line 15", noise source in the output line 15" is removed. However, when the output line 15" was also proved to be not defective, the terminal device in the output line 15' of the splitter 15 is removed, a connector is connected back, and thus the work to detect noise sources is discontinued after removing noise sources in other transmission lines.

The conventional test method as described above is associated with a disadvantage that service is interrupted during the period of testing, because the portion of transmission line to be tested must be end-blocked. Therefore, the fact gives rise to a problem that testing for a long time is impossible and thus precise measurements of noises for respective transmission lines, one by one, are not easy.

SUMMARY OF THE INVENTION

Therefore, the object of the present invention is to provide an apparatus and a method for testing a CATV transmission line which make it possible to measure noise levels accurately for respective transmission lines and to perform a statistical noise analysis by easily detecting noises, intermittently occurring.

According to a feature of the present invention to achieve the above described object, there is provided an apparatus for testing a CATV transmission line, wherein a down-signal to subscribers from a broadcasting station is split into a plurality of signals and an upstream transmission line for leading said down-signal and a plurality of downstream transmission lines for transmitting split signals are separated from each other, whereby said upstream transmission line and said downstream transmission lines are tested separatedly, said apparatus comprising one main input terminal adapted to be connected to said upstream transmission line, a plurality of main output terminals adapted to be connected to a plurality of downstream transmission lines respectively, a splitter for splitting a signal from said main input terminal to a plurality of first split output terminals, said splitter being connected to said main input terminal and provided with said plurality of first split output terminals, and a plurality of second split output terminals, connected to said plurality of main output terminals respectively and arranged so as to be connectable to said plurality of first split output terminals respectively.

According to another feature of the present invention, there is provided a method for testing a CATV transmission line, for separately testing an upstream transmission line, connected to a particular one of a plurality of splitters, and a plurality of downstream transmission lines, in a transmission system for CATV service, said transmission system comprising a plurality of splitters, for splitting a down-signal led-in from said upstream transmission line to be transmitted to a plurality of downstream transmission lines, said plurality of splitters being connected to upstream transmission lines from the side of a CATV broadcasting station and connected to plural downstream transmission lines from the side of subscribers; said method comprising steps of; removing said particular splitter from said transmission system; disposing a testing device in the place of said particular splitter removed, said testing device comprising one main input terminal, a plurality of main output terminals, a splitter for splitting a signal from said main input terminal to a plurality of first split output terminals, said splitter being connected to said main input terminal and provided with said plurality of first split output terminals, and a plurality of second split output terminals, connected to said plurality of main output terminals respectively and arranged so as to be connectable to said plurality of first split output terminals respectively; connecting said main input terminal to said upstream transmission line; connecting said plurality of main output terminals to said plurality of downstream transmission lines respectively; and testing said upstream transmission line or said plurality of downstream transmission lines.

BRIEF DESCRIPTION OF THE DRAWINGS

FIG. 2a shows a main module of an apparatus for testing a CATV transmission line according to the present invention, and FIGS. 2b to 2d show configurations of submodules to be inserted in the main module as shown in FIG. 2a.

DETAILED DESCRIPTION OF THE INVENTION

Figure 1:
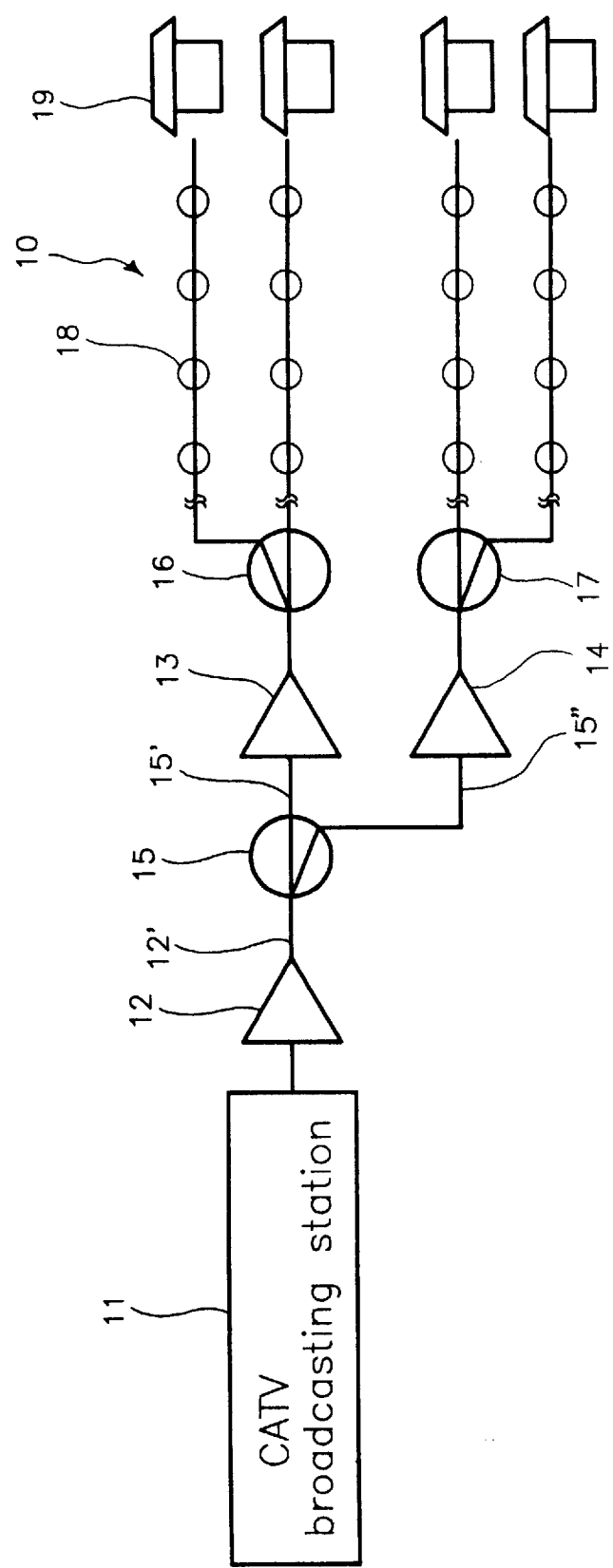
FIG. 1 shows a schematic arrangement of transmission system for bidirectional CATV service.

The present invention will be described in detail with regard to a preferred embodiment in conjunction with attached drawings below.

In FIG. 2a, a main module of an apparatus for testing a CATV transmission line according to the invention is depicted and in FIGS. 2b to 2d, configurations of submodules to be inserted in the main module are shown. An apparatus for testing a CATV transmission line 20 according to the invention comprises one main input terminal, a plurality of main output terminals (first to third terminal), splitter 21 for splitting a signal from said main input terminal to a plurality of first split output terminals, said splitter being connected to said main input terminal and provided with said plurality of first split output terminals, and a plurality of second split output terminals, connected to said plurality of main output terminals respectively and arranged to correspond to said plurality of first split output terminals respectively. An apparatus for testing a CATV transmission line 20 according to the invention, for instance, is so constructed as to replace the conventional splitter 15 for separate tests of transmission lines 15', 15" in FIG. 1, after it is removed. In that case, the main input terminal as shown in FIG. 2a will be connected to the output terminal of the amplifier 12 as shown in FIG. 1, and the first and second output terminals of the main output terminals as shown in FIG. 2a will be connected to the transmission line 15' and 15" as shown in FIG. 1 respectively. The rest terminal or the third terminal as shown in FIG. 2a could be connected to a third output if the splitter 15 in Figure had three outputs or left excess in preparation for possible future expansion.

According to a preferred embodiment of the invention, between the side of broadcasting station and the side of subscribers, down- or up-signals in the RF band are cut off and only commercial power frequency of 60 Hz, for instance, is allowed to pass, because between the main input terminal and a plurality of main output terminals of a device for separate tests 20, low pass filters consisting of, for instance, inductors 22, 23, 24, 25 are connected through jumpers for power supply. Therefore, it is provided that power supply toward the down end of the line under test can be conducted even during the test.

Now, a method for conducting separate tests by use of a device for CATV separate tests as described previously will be described by referring to FIGS. 2a through 2d. In case of testing the transmission line which is connected to the first output terminal of a multitude of output terminals of the testing device 20, a jumper module 27 as shown in FIG. 2c is connected between one terminal of a multitude of first split output terminals of the splitter 21 and the one of the second split output terminals which is connected to the first output terminal of the testing device 20 and high pass filter modules 26 as shown in FIG. 2b are connected between the rest of the first split output terminals and the corresponding second split output terminals respectively. Similarly when the transmission lines each connected to the second and third output terminals of the testing device 20 are tested, in the same manner as in the above-mentioned case of testing the transmission line connected to the first output terminal, one of a multitude of the first split output terminals of the splitter 21 and a second split output terminal connected to the second or third output terminal is connected by a jumper module 27 of FIG. 2c, and the rest of the first split output terminals and their corresponding second split output terminals are connected by high pass filter modules 26 of FIG. 2b respectively.

Secondly, in case of testing noise characteristics in upstream transmission line connected to the main input terminal of the testing device 20, a plurality of first split output terminals and a plurality of second split output terminals are connected by terminal modules 28 as shown in FIG. 2d to shut off up-transmissions and thereafter a separate test on an upstream transmission line is conducted by measuring noise level, for example, at a upstream amplifier such as the amplifier 12. The terminal modules 28 as shown in FIG. 2d serve to ground each of the first and second split output terminals by terminal resistors 29. The terminal resistors used there have preferably a resistance value matching with the impedance of a transmission line, which extends from the main input terminal in the upward direction, for maximum power transmission to the amplifier 12 as a position of noise test. Moreover, it will be evident to a man skilled in the art that a terminal module 28 may further include inductors or capacitors, matching with the impedance characteristic of a corresponding transmission line depending on the characteristic of impedance, as the case may be, besides the terminal resistors 29.

In a manner of connections described above, because the high pass filter module 26 has such a characteristic as allows only the down-signal in a relatively high RF band to pass through but shut off the up-signals in a relatively low RF band, only the down-signal passes to the main output terminals which are not currently under test and both the down- and up-signals pass to and from the main output terminal which is currently under test, whereby an accurate detection can be made as to whether noise was led in the transmission line connected to the main output terminal, which is being tested, without causing a problem of service interruption during the test as opposed to the cases of conventional art, as the down-signal can uninterruptedly be transmitted to all main output terminals, even during the test.

Furthermore, an apparatus for testing a CATV transmission line according to the invention can be used in place of an existing splitter at the same installation site inside a building like an apartment house where non-standard cables are layed. Generally, in buildings like old apartment house, conventional non-standard coaxial cables are used as precinct cables for transmitting CATV signals, but the coaxial cables are so poor in shielding characteristics that penetration of external noises is extremely easy. Accordingly, a quality bidirectional service could be hardly expected and critical interference with a good service to other subscribers could not be prevented, before the cables with the structure of triple or more shields suited for transmission of CATV signals are substituted for the existing precinct ones. In that case, up-signals from the building where non-standard cables are layed need to be shut off for a temporary period or until installation of standard cables is completed. However, up-transmission of noise signals due to the non-standard cables can be effectively shut off, without inflicting any harm on other subscribers, by using the apparatus for testing a CATV transmission line according to the present invention in place of an existing splitter at the same installation site inside a building where non-standard cables are layed.

The invention was described by way of an exemplary embodiment, which however should not be interpreted in any limiting sense. Obviously a variety of modifications or combinations of the embodiment described above in conjunction with the detailed description of the invention to derive some varied embodiments would be evident to a man skilled in the art.

Therefore, the appended claims should be understood to include all those modifications and embodiments.

I claim:

1. An apparatus for testing a CATV transmission line, wherein a down-signal to subscribers from a CATV broadcasting station is split into a plurality of signals, and an upstream transmission line for leading said down-signal and a plurality of downstream transmission lines for transmitting split signals are separated from each other, whereby said upstream transmission line and said downstream transmission lines are tested separately, said apparatus comprising:
   one main input terminal adapted to be connected to said upstream transmission line,
   a plurality of main output terminals adapted to be connected to a plurality of downstream transmission lines respectively,
   a splitter for splitting a signal from said main input terminal to a plurality of first split output terminals, said splitter being connected to said main input terminal and provided with said plurality of first split output terminals, and
   a plurality of second split output terminals, connected to said plurality of main output terminals respectively and arranged so as to be connectable to said plurality of first split output terminals respectively.

2. The apparatus according to claim 1, wherein in case of testing a particular one of said plurality of downstream transmission lines, a jumper line is connected between one of said plurality of first split output terminals and the one of the second split output terminals which is connected to said particular downstream transmission line, and high pass filters are connected between the rest of the first split output terminals and the corresponding second split output terminals respectively.

3. The apparatus according to claim 1, wherein in case of testing an upstream transmission line, connections between said plurality of first split output terminals and said plurality of second split output terminals are made by terminating all of said plurality of first split output terminals and said plurality of second split output terminals to ground points.

4. The apparatus according to claim 1, wherein said main input terminals and said main output terminals are connected through low pass filters respectively so that power supply to a plurality of downstream transmission lines can be conducted.

5. A method for testing a CATV transmission line, for separately testing an upstream transmission line, connected to a particular one of a plurality of splitters, and a plurality of downstream transmission lines, in a transmission system for CATV service, said transmission system comprising a plurality of splitters, for splitting a down-signal led-in from said upstream transmission line to be transmitted to a plurality of downstream transmission lines, said plurality of splitters being connected to upstream transmission lines from the side of a CATV broadcasting station and connected to a plurality of downstream transmission lines from the side of subscribers, said method comprising steps of:
   removing said particular splitter from said transmission system;
   disposing a testing device in the place of said particular splitter removed, said testing device comprising one main input terminal, a plurality of main output terminals, a splitter for splitting a signal from said main input terminal to a plurality of first split output terminals, said splitter being connected to said main input terminal and provided with a plurality of first split output terminals, and a plurality of second split output terminals, connected to said plurality of main output terminals respectively and arranged so as to be connectable to said plurality of first split output terminals respectively;
   connecting said main input terminal to said upstream transmission line;
   connecting said plurality of main output terminals to said plurality of downstream transmission lines respectively; and
   testing said upstream transmission line or said plurality of downstream transmission lines.

6. The method according to claim 5, wherein said step of testing comprises, in order to test a particular one of said plurality of downstream transmission lines, connecting a jumper line between one of said plurality of first split output terminals and the one of the second split output terminals which is connected to said particular downstream transmission line, and connecting high pass filters between the rest of the first split output terminals and the corresponding second split output terminals respectively.

7. The method according to claim 5, wherein said step of testing comprises, in order to test an upstream transmission line, terminating each of said plurality of first split output terminals and said plurality of second split output terminals to ground points.

* * * * *